Figure 1:
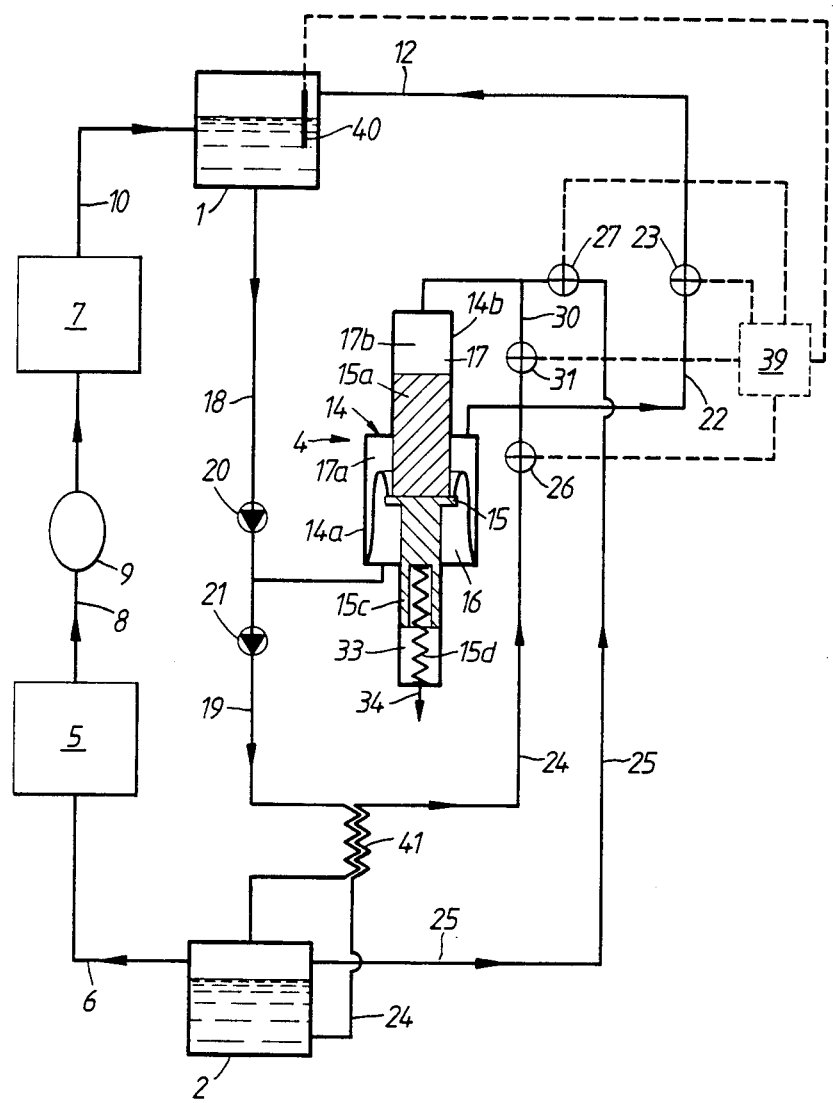

United States Patent [19]

Fitt

[11] Patent Number: 4,679,409
[45] Date of Patent: Jul. 14, 1987

[54] ABSORPTION REFRIGERATION CYCLE

[75] Inventor: Peter W. Fitt, Somerset, England

[73] Assignee: I C Gas International Limited, Somerset, England

[21] Appl. No.: 907,894

[22] Filed: Sep. 16, 1986

[30] Foreign Application Priority Data

Sep. 17, 1985 [GB] United Kingdom ............... 8522932

[51] Int. Cl.⁴ .................................................. F25B 15/00
[52] U.S. Cl. ........................................ 62/476; 62/483
[58] Field of Search ...................................... 62/476, 483

[56] References Cited

U.S. PATENT DOCUMENTS

| 2,005,258 | 6/1935 | Flukes. | |
|---|---|---|---|
| 2,929,222 | 3/1960 | Lang. | |
| 2,930,204 | 3/1960 | Lang. | |
| 3,046,756 | 7/1962 | Whitlow et al. | 62/483 X |
| 3,293,881 | 12/1966 | Walker | 62/476 |
| 4,619,119 | 10/1986 | Dijkstra et al. | 62/476 |

FOREIGN PATENT DOCUMENTS 628807 10/1927 France.

Primary Examiner—Lloyd L. King
Attorney, Agent, or Firm—Wood, Dalton, Phillips, Mason & Rowe

[57] ABSTRACT

An absorption heat pump system comprises an absorber, a generator, a condenser, an evaporator, and a pump assembly for pumping liquid (absorbent with absorbed refrigerant) from the absorber to the generator. The pump is driven by fluid from the generator which is then passed to the absorber and which comprises the liquid (absorbent depleted of refrigerant) which is conventionally returned to the absorber and, under certain circumstances, vapor from the generator to balance the flow of liquid between the absorber and the generator. The driving chamber of the pump assembly is separated into two parts, the lower part is connected to the liquid space of the generator for receiving liquid therefrom via solenoid valve means, and the upper part is connectable either to the liquid space of the generator or to the vapor space of the generator via solenoid valve means, both chamber parts being exhausted to the absorber via solenoid means. The solenoid valve means are controlled by a controller which is connected to a liquid level sensor sensing the level of fluid in the generator or the absorbers to alternate the supply of liquid and vapor to the second chamber part in dependence on the level of liquid in the generator or absorber.

18 Claims, 2 Drawing Figures

ABSORPTION REFRIGERATION CYCLE

The present invention relates to improvements in systems using absorption refrigeration cycles, such for example as heat pumps.

Heat pump systems using absorption refrigeration cycles conventionally comprise absorber means in which the refrigerant, for example ammonia, is absorbed in an absorbent, for example water, generator means to which the absorbent with absorbed refrigerant is pumped at an increased pressure and in which the refrigerant is driven out of the absorbent, the absorbent being returned to the absorber means via pressure reducing means, condenser means to which the refrigerant from the generator means is supplied and in which it cools and condenses, and evaporator means to which the condensed refrigerant is supplied via an expansion valve. Heat is supplied to the generator means and evaporator means, and the condenser means and absorber means are both associated with heat exchange means connected in a utilisation circuit, for example a hot water and/or central heating system.

With such conventional systems, energy is unnecessarily lost from the system in the pressure reducing means between the generator means and the absorber means and energy has to be provided to the system to pump liquid from the absorber means to the generator means.

In G.B. Pat. No. 2086026, there is described a system in which part of the energy required to drive the pump is provided by energy from the liquid flowing from the generator means to the absorber means. However, because a smaller volume of liquid flows from the generator means to the absorber means than flows from the absorber means to the generator means, the system of the above referred to G.B. Patent becomes very complex when it is endeavoured to balance the flow volumes.

With a view to simplifying the system, it is now proposed to provide a pump for pumping liquid from the absorber means to the generator means for which all the energy required to pump the liquid is provided by fluid from the generator means. This fluid will comprise liquid and, under certain circumstances, vapour, to enable balancing of the liquid flow volumes.

Throughout the specification, the term "vapour" will be used to describe the gaseous phase of the absorbent refrigerant fluid mixture and the term "liquid" will be used to describe the liquid phase of the fluid mixture.

According to the present invention there is provided a system for using an absorption refrigeration cycle and comprising absorber means, generator means, condenser means, evaporator means and a pump assembly for pumping liquid from the absorber means to the generator means, the pump assembly comprising a cylinder, piston means separating the cylinder into a first chamber connected by first valve means to the absorber means and to the generator means for receiving liquid from the absorber means to be pumped to the generator means, and a second chamber connected by second valve means to the generator means and the absorber means for receiving fluid from the generator means and passing it to the absorber means, and wherein the second chamber comprises first and second parts, the first part of the second chamber being connected by the second valve means to the liquid space of the generator means and the second part of the second chamber being connected by the second valve means to both the vapour and the liquid spaces of the generator means, and means are provided for detecting the level of liquid in the generator means or the absorber means and for controlling the second valve means to permit either liquid or vapour to flow into the second part of the second chamber in dependence on the level of liquid in the generator means or absorber means.

Thus in one mode of operation liquid is supplied from the liquid space of the generator means to both parts of the chamber. In an alternative mode of operation, liquid is supplied from the liquid space of the generator means to the first part of the second chamber and vapour is supplied from the vapour space of the generator means to the second part of the second chamber. The level of liquid in the generator means or, preferably, the absorber means is detected and used by the control means to switch the system from one mode of operation to the other to balance the liquid flow volumes between the generator means and absorber means.

Preferably the effective area of the piston for the first chamber is smaller than the effective area of the piston for the second chamber, the differential area being determined in dependence on the forces required to operate the pump at the required rate.

Preferably the effective area of the piston for the second part of the second chamber is smaller than that for the first part of the second chamber, the respective effective areas being determined in dependence on operation of the overall system and the anticipated differential volume of liquid flowing between the absorber means and the generator means.

At the end of each working stroke of the piston of the pump, the piston is returned to its initial position and the return force on the piston may be provided by for example a spring or by fluid in the system, e.g. vapour or liquid supplied from the generator means. Where liquid or vapour is provided, it may conveniently be supplied to a secondary chamber associated with the piston and which has an effective area substantially equal to the difference in the effective areas of the piston for the first and second chambers of the pump.

The second chamber of the pump is advantageously divided into the two parts by a slave piston associated with and coaxial with the main piston and which is received in a part of the chamber which has a smaller transverse area than the part of the chamber in which the main piston slides. The slave piston may be fixed to the main piston or may float relative thereto and may then be biased towards the main piston so that the main and slave pistons move together.

Embodiments according to the invention will now be described by way of example only, with reference to the accompanying drawings.

Figure 2:
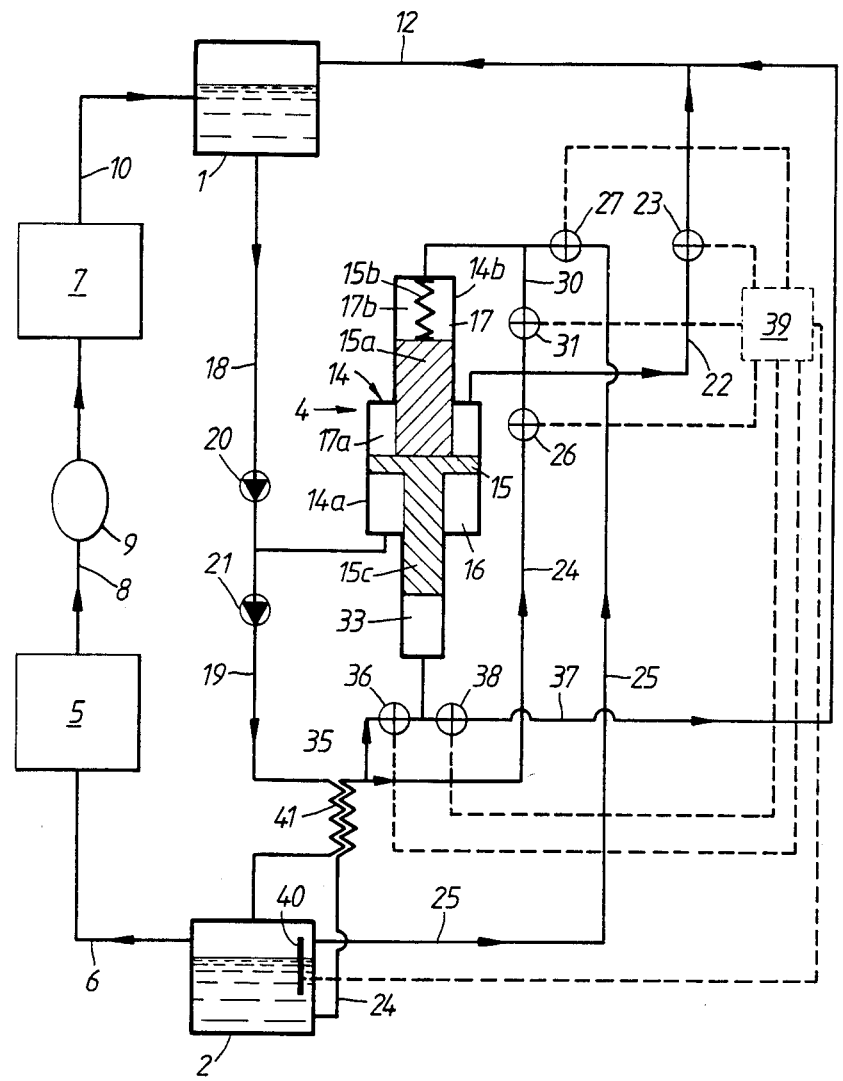

In the drawings FIGS. 1 and 2 are diagrammatic views of embodiments of systems according to the present invention.

The systems shown in FIGS. 1 and 2 are both intended to operate as heat pump systems and both comprise an absorber 1 in which a refrigerant, for example ammonia, is absorbed in an absorbent, e.g. water, a generator 2 to which the absorbent with absorbed refrigerant (called the strong solution) is supplied by a pump 4 and in which the strong solution is heated to drive off the refrigerant, the absorbent depleted of refrigerant (called the weak solution) from the generator being returned to the absorber 1 as will be described hereafter, a condenser 5 to which the refrigerant from the generator is supplied at high pressure via a line 6 and in which it condenses, and an evaporator 7 to which the condensed refrigerant is supplied via a line 8 provided with an expansion valve 9, and in which the refrigerant evaporates and from which the evaporated refrigerant is supplied via a line 10 to the absorber 1.

The absorber 1, generator 2, condenser 5 and evaporator 7 may take any suitable forms. Equally, while as described above the refrigerant used in the system may be ammonia and the absorbent may be water, other appropriate refrigerants and absorbents may be used.

In the system shown in FIGS. 1 and 2, the energy in the liquid weak solution flowing from the generator to the absorber is used for driving the pump 4 and as required is supplemented by energy in the vapour generated by the generator.

As shown in FIGS. 1 and 2, the pump 4 comprises a cylinder 14 provided with a piston 15 which is, as shown in FIG. 1, in the form of a diaphragm and, as shown in FIG. 2, in the form of a rigid disc. The piston 5 divides the cylinder into two chambers 16, 17. Chamber 16 is connected by ducts 18,19 each provided with a one-way valve 20,21, to the absorber 1 and the generator 2 respectively, the valves 20,21 being arranged to permit liquid to flow from the absorber to the generator.

The cylinder 14 comprises a main part 14a housing the piston 15 and an upper part 14b coaxial with the main part but of reduced area and in which a slave piston 15a is received and which divides the chamber 17 into a first part 17a within the main part of the cylinder and a second part 17b in the upper part of the cylinder. The slave piston 15a may be attached to the main piston 15 (FIG. 1) or may float freely relative thereto and is then biassed into contact with, to move with, piston 15 by a spring 15b (FIG. 2).

The lower part 17a of the chamber 17 is connected by a duct 24 provided with a solenoid operated valve 26 to the liquid space of the generator 2 and by a duct 22 provided with a solenoid operated valve 23 to the absorber 1. Part 17b of the chamber is connectable either by a duct 25, provided with a solenoid operated valve 27, to the vapour space of the generator or by a duct 30, provided with a solenoid operated valve 31, and duct 24 to the liquid space of the generator. Part 17b of the chamber is also connectable by ducts 30 and 22 to the absorber.

The effective area of piston 15 in chamber 17 is greater than the effective area of the piston 15 in chamber 16, the differential area being determined in dependence on the forces required to operate the pump and the rate at which the pump is required to operate. This differential area is advantageously obtained as shown in FIGS. 1 and 2 by providing the piston 5 with an extension 15c extending through chamber 16.

The pump is arranged to operate such that fluid entering chamber 17 will drive the piston 15 to expel liquid in chamber 16. Return of the piston 15 to its initial position may be obtained in a number of different ways. For example as shown in FIG. 1 a spring 15d may be provided bearing on the lower end of the piston extension 15c. Advantageously the spring 15d is housed in an auxiliary chamber 33 forming an extension of cylinder 14 and receiving the end of piston extension 15c, and which is provided with an outlet 34 which may for example be connected to the absorber for exhausting any fluid which may leak into this chamber from chamber 16. Alternatively, as shown in FIG. 2, the chamber 33 may be arranged to be provided with pressurised fluid, for example from the generator. As shown in FIG. 2, liquid is supplied to chamber 33 through a duct 35 provided with a solenoid operated valve 36 and is exhausted through duct 37 provided with a solenoid operated valve 38 to the absorber.

In one mode of operation of the system, valve 31 is maintained open and valve 27 is closed. Valves 26 and 23 are then opened and closed alternately to allow liquid to flow from the generator to both chamber parts 17a and 17b and to be exhausted therefrom to the absorber. When valve 26 is open liquid in chamber 16 of the pump is driven therefrom through one-way valve 21 to the generator and when valve 23 is open the piston 15 is returned to its initial position drawing in liquid from the absorber through one-way valve 20. Where the piston 5 is returned to its initial position by liquid from the generator (FIG. 2), solenoid operated valves 36 and 38 are operated synchronously with valves 23 and 26, valve 36 being opened when valve 23 is opened.

The solenoid operated valves 23, 26, 27 and 31, and 36, 38 where provided, are all controlled by a central controller 39.

In the other mode of operation, valve 27 is opened and closed synchronously with valve 26, and valve means 31 is opened and closed synchronously with valve 23. As a consequence, when valves 26 and 27 are open liquid from the generator is provided to chamber part 17a and vapour from the generator is provided to chamber part 17b, and when valves 31 and 23 are open, both chamber parts are exhausted to the absorber.

One of the two modes of operation of the system is used in dependence on the level of liquid in either the absorber or the generator to ensure an overall balance of the liquid flow volumes between the absorber and the generator.

To this end, a liquid level detector 40 is arranged to detect the level of liquid in one of the absorber or generator. Preferably, as shown in FIG. 1, the level detector 40 is associated with the absorber 1 because the atmosphere in the absorber is much less aggressive and the liquid/vapour interface is more stable and therefore easier to detect in the absorber than in the generator. The level detector 40 is connected to the controller 39 which changes operation of the solenoid valves to cause a change from the above described one mode of operation to the other mode of operation when the level of liquid in the absorber reaches or rises above a predetermined level and which then causes a change back to the one mode when the level of liquid reaches or drops below the predetermined level or a lower predetermined level. It will of course be appreciated that the change over from one mode of operation to the other and vise versa occurs during the part of the cycle in which fluid is being exhausted from the chamber parts 17a, 17b.

If however the level detector is associated with the generator, as shown in FIG. 2, the controller 39 causes a change from one mode of operation to the other when the level of liquid in the generator reaches or drops below a predetermined level and a change back to the one mode of operation when the level of liquid reaches or rises above the predetermined level or a higher predetermined level.

It will be appreciated that the relative effective areas of chambers parts 17a and 17b can be varied as required in dependence on the proportion of vapour to be used relative to liquid when the pump is operating with both liquid and vapour from the generator.

As shown in both FIGS. 1 and 2, the liquid pumped by pump 4 from the absorber to the generator may be heated by heat exchange in heat exchanger 41 with the liquid flowing in duct 24 from the generator to the pump. Although, during those periods of operation of the system in which vapour is supplied to chamber part 17b there will be a reduction in flow of liquid in duct 24, nonetheless liquid will flow in duct 24 in each cycle of the pump and the heat exchanger 41 will thus provide thermal energy to the liquid in duct 19 during the entire period of operation of the system. Such a heat exchanger cannot of course be provided in duct 25 because any vapour flowing in duct 25 to chamber 17b must remain uncondensed and to this end duct 25 should be as short as possible and insulated to prevent loss of heat.

What is claimed is:

1. A system for using an absorption refrigeration cycle and comprising:
   absorber means;
   generator means having a liquid space and a vapour space;
   condenser means;
   evaporator means; and
   a pump assembly for pumping liquid from the absorber means to the generator means, said pump assembly comprising a cylinder, piston means separating said cylinder into a first chamber connected by first valve means to said absorber means and said generator means for pumping liquid from said absorber means to said generator means and a second chamber connected by second valve means to said generator means and said absorber means for receiving fluid from said generator means and passing it to said absorber means, wherein said second chamber of said pump assembly comprises first and second parts, said first part of said second chamber being connected by said second valve means to said liquid space of said generator means and said second part of said second chamber being connectable by said second valve means to said vapour space and to said liquid space of said generator means, means being provided for detecting the level of liquid in one of said generator means and said absorber means and for controlling said second valve means to permit either liquid or vapour to flow into said second part of said second chamber in dependence on the level of liquid in said generator means or said absorber means respectively.

2. A system as claimed in claim 1, wherein said liquid level detecting means are associated with said absorber means for detecting the level of liquid therein, and said control means are adapted to control said second valve means to change the supply of fluid to said second part of said second chamber from liquid to vapour when the level of liquid reaches or exceeds a first predetermined level.

3. A system as claimed in claim 2, wherein said control means are adapted to control said second valve means to change the supply of fluid to said second part of said second chamber from vapour to liquid when the level of liquid reaches or drops below said first predetermined level.

4. A system as claimed in claim 2, wherein said control means are adapted to control said second valve means to change the supply of fluid to said second part of said second chamber from vapour to liquid when the level of liquid reaches or drops below a second predetermined level below said first predetermined level.

5. A system as claimed in claim 1, wherein said cylinder of said pump assembly comprises a main part in which a main piston of said piston means moves and an upper part of reduced section receiving a slave piston associated with said main piston, said first part of said second chamber being defined within said main part of said cylinder and said second part of said second chamber being defined within said upper part of said cylinder by said slave piston.

6. A system as claimed in claim 5, wherein said slave piston is fixed to said main piston for movement therewith.

7. A system as claimed in claim 5, wherein said slave piston is biased towards said main piston for movement therewith.

8. A system as claimed in claim 5, wherein said main piston comprises a diaphragm.

9. A system as claimed in claim 1, wherein the effective area of said piston means exposed to said second chamber is greater than the effective area of said piston means exposed to said first chamber.

10. A system as claimed in claim 9, wherein said piston means comprises an extension passing through said first chamber.

11. The system as claimed in claim 10, wherein said piston means is subject to a return force returning said piston means to an initial position, said return force being exerted on said extension of said piston means.

12. A system as claimed in claim 1, wherein said piston means is subject to a return force for returning the piston to an initial position, said return force being provided by resilient means.

13. A system as claimed in claim 1, wherein said piston means is subject to a return force for returning said piston means to an initial position, said return force being provided by fluid from said generator means, means being provided for supplying the fluid during the return stroke of said pump assembly.

14. A system as claimed in claim 1, including heat exchange means in a duct through which liquid is supplied from said generator means to said second chamber of said pump assembly and for heating liquid flowing from the first chamber of said pump assembly to said generator means.

15. A system as claimed in claim 14, wherein said heat exchange means is provided in a duct through which liquid is supplied from said generator means to said first part of said second chamber.

16. A system as claimed in claim 5, wherein said piston means comprises an extension passing through said first chamber and means are provided for exerting a force on said extension for returning said piston means to an initial position.

17. A system as claimed in claim 16, wherein said means for exerting a return force on said piston means comprises resilient means.

18. A system as claimed in claim 16, including means for supplying fluid from said generator means during the return stroke of said pump assembly to an end face of said extension of said piston means for returning said piston means to an initial position.

* * * * *